June 19, 1951

R. L. WALLACE, JR., ET AL
POSITION INDICATOR FOR USE IN
BLIND FLYING OF TOWED GLIDERS 2,557,900

Filed Oct. 31, 1947

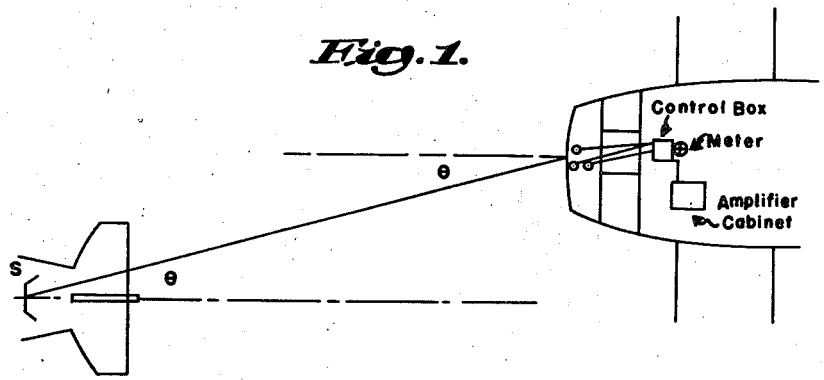

POSITION OF GLIDER RELATIVE TO TOW
PLANE FOR A SPACE ANGLE θ

GLIDER IN CORRECT POSITION BEHIND TOW PLANE
SOUND SIGNALS REACHING M1 AND M2 ARE IN PHASE

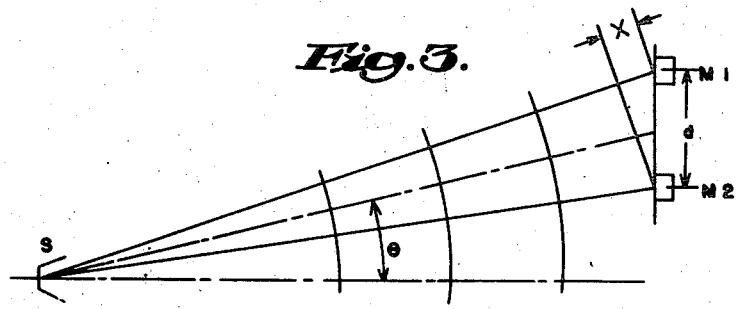

GLIDER NOT DIRECTLY BEHIND TOW PLANE
SIGNALS REACHING M1 AND M2 ARE NOT IN PHASE

Inventors:
Robert L. Wallace, Jr.
Harold L. Ericson
by H. Schmitt Attorney

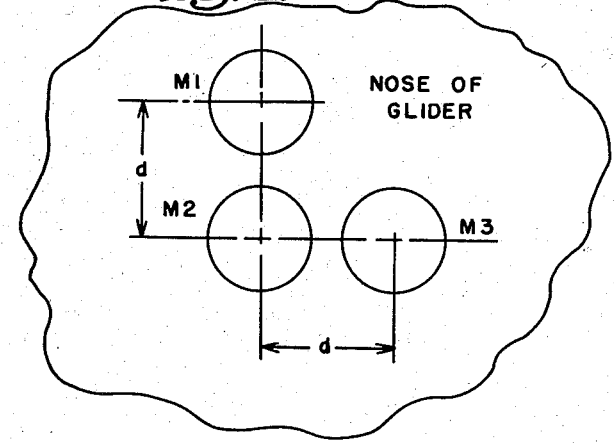
POSITION OF MICROPHONES ON NOSE OF GLIDER
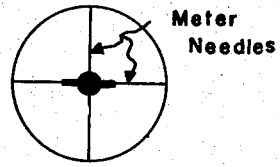
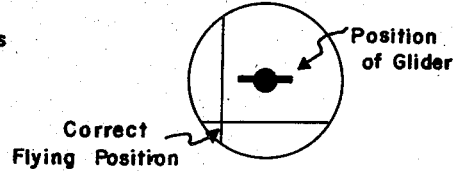
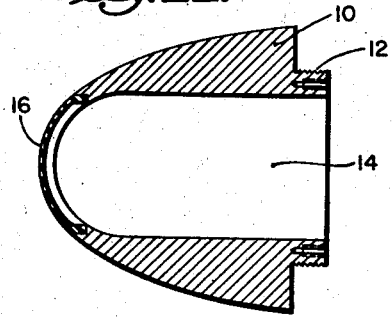
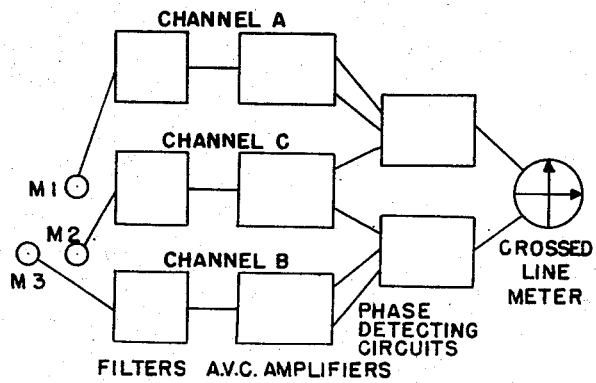

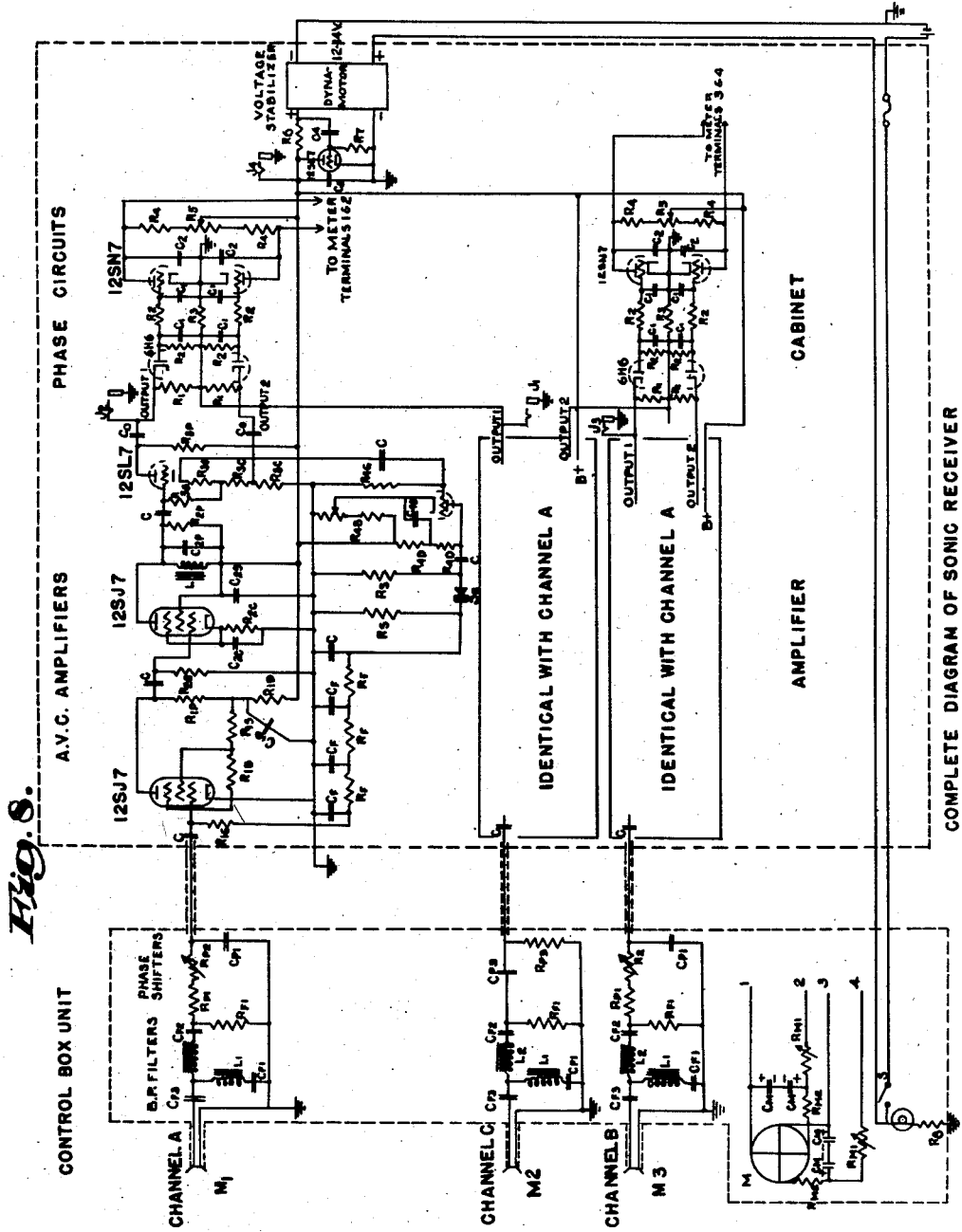

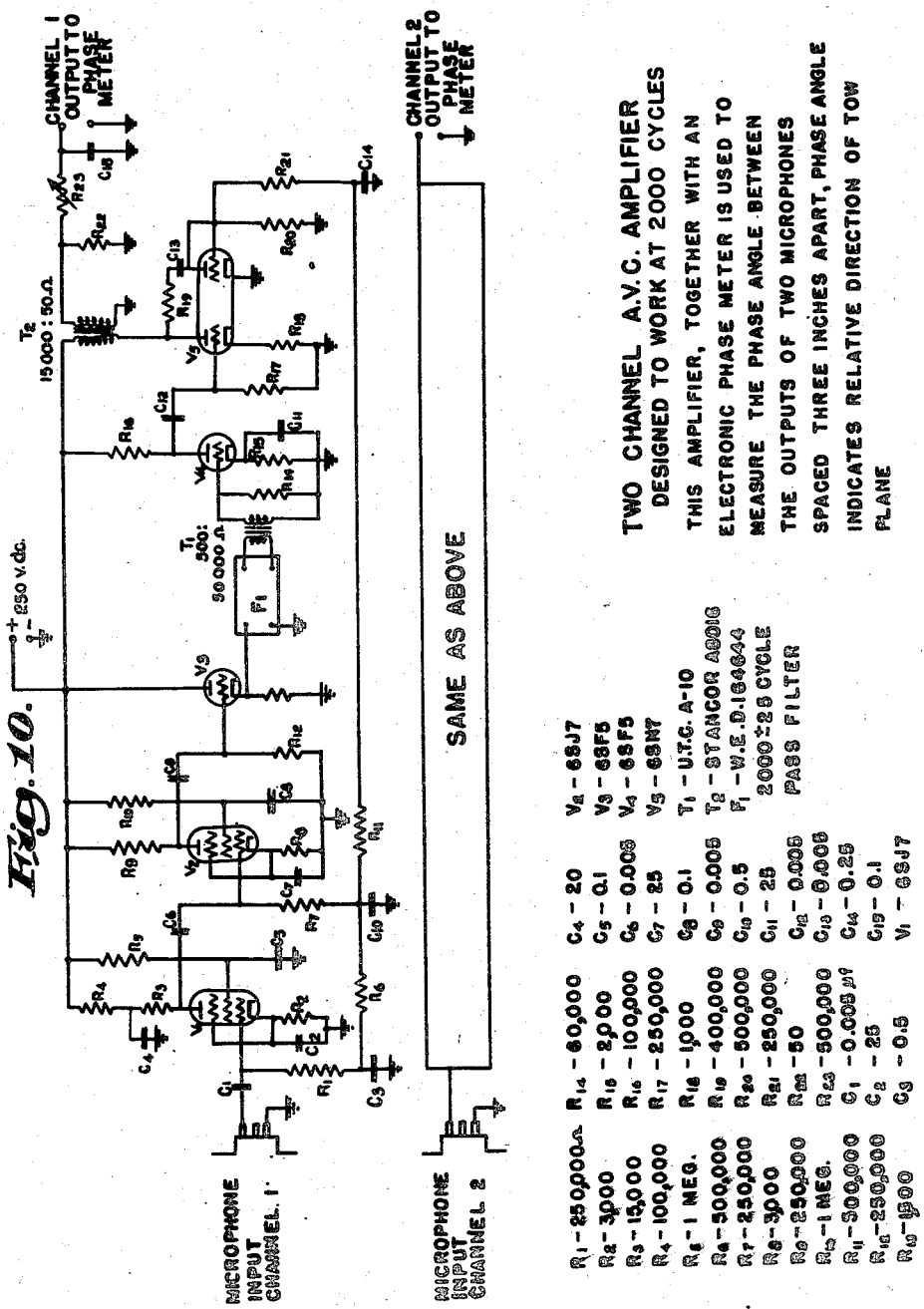

Patented June 19, 1951

2,557,900

UNITED STATES PATENT OFFICE 2,557,900

POSITION INDICATOR FOR USE IN BLIND FLYING OF TOWED GLIDERS

Robert L. Wallace, Jr., Coolidge, Tex., and Harold L. Ericson, Los Angeles, Calif., assignors to the United States of America as represented by the Secretary of the Navy Application October 31, 1947, Serial No. 783,350

4 Claims. (Cl. 177—352)

This invention relates to position indicating equipment for aircraft. More particularly, the invention is concerned with sonic position indicating equipment for use in blind flying of towed gliders.

It is necessary for gliders in tow to maintain, within certain limits, the proper relative position behind the towing airplane. When visibility is good, the glider pilot is able to do this simply by watching the two planes; but for flying under conditions of poor visibility, some means must be provided to indicate to him his position relative to the tow plane.

An object of the invention, therefore, is to develop acoustic and visual means which will provide a continuous position indication reliably and accurately under the relatively harsh conditions obtained in flight. An other object of the invention is to provide position indicating means which meet the practical limitations of size, weight, power consumption, and simplicity which should be imposed on equipment developed for use in gliders.

We have found that satisfactory position indication of a towed glider may be obtained by observing sound signals emitted from a tow plane and then converting the signals into visual meter readings. An important feature of the invention consists in determining and then producing a noise signal which is clearly discernible in a high ambient noise field such as that resulting from the wind stream of a towed glider.

Another important feature consists in sonic receiver means for integrating the output of a plurality of microphones located at varying distances from the tow plane.

Another important feature consists in an arrangement of microphones on the hull of a glider in such a manner that the microphones produce the minimum possible turbulence in the air which passes over them, thus enabling the microphones to work quietly.

Other novel features will appear from the following description of the invention.

In the accompanying drawings:

Fig. 1 is a diagrammatic view illustrating a tow plane and glider;

Fig. 2 is another diagrammatic view further illustrating relative positions of a glider and tow plane;

Fig. 3 is a diagrammatic view illustrating another relative position of glider and tow plane;

Fig. 4 is a diagrammatic view illustrating fragmentarily the front end of a glider;

Fig. 5 is an elevational view illustrating diagrammatically an indicator meter;

Fig. 6 is another elevational view of the meter;

Fig. 7 is a functional diagram illustrating sonic receiving and metering means;

Fig. 8 is a schematic diagram illustrating the sonic receiver circuit of the invention;

Fig. 10 is still another schematic diagram illustrating an amplifier circuit utilized for phase angle measurements; and Fig. 11 is a cross-sectional view of a glider nosepiece.

Figure 9:
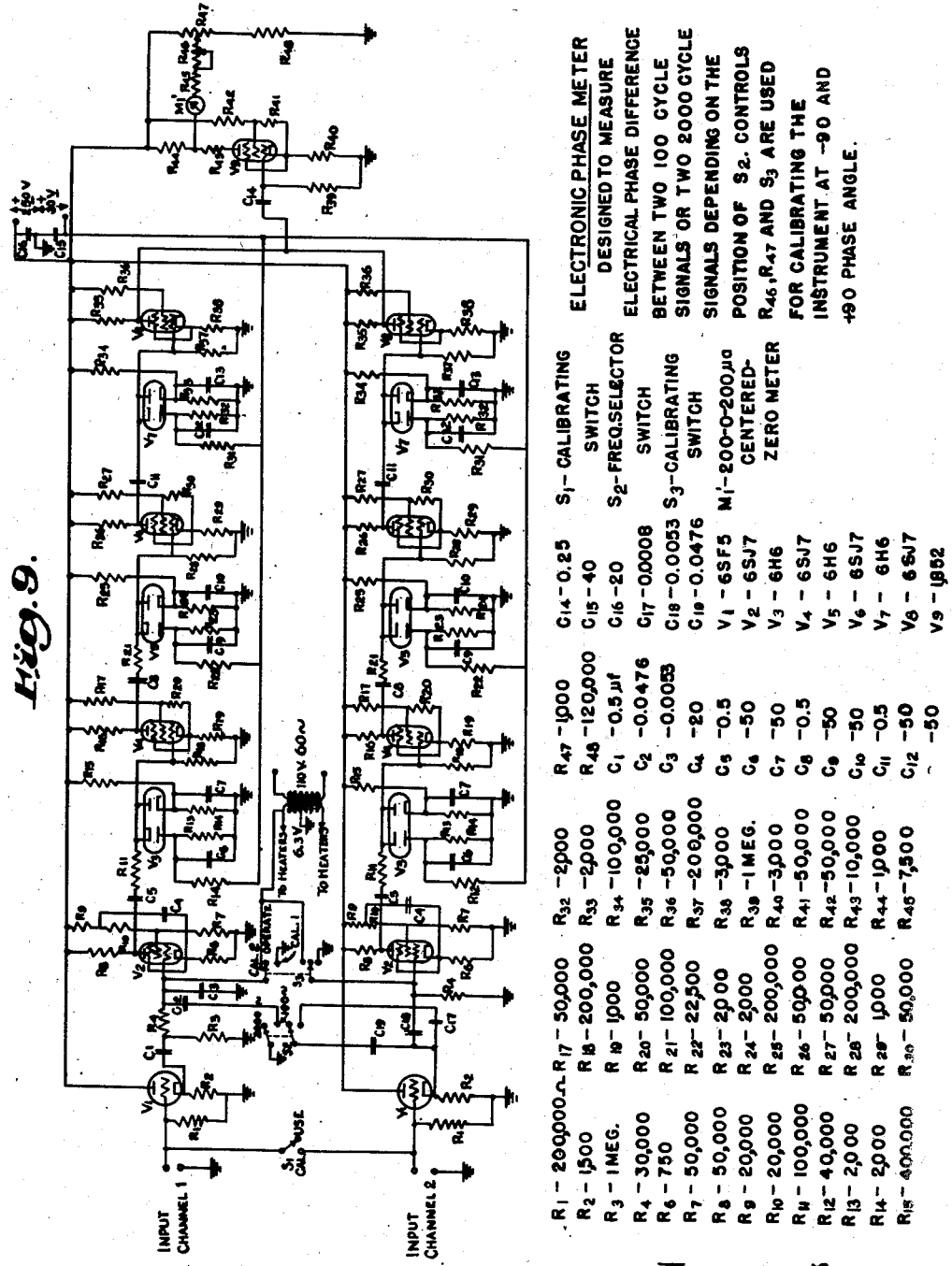
Fig. 9 is another schematic diagram illustrating an electronic phase meter circuit.

The method and equipment illustrated by the drawings constitute a preferred embodiment of the invention. It should be understood, however, that the invention is not limited to the specific form described and may be practiced either in whole or in part in various other applications wherever indication of position or other form of signalling apparatus may be desired to be carried out.

The invention, in general, includes the steps of producing a noise signal on a tow plane, detecting the noise signal at several different points on a towed glider, and then integrating the several detected signals and converting them into visual meter readings.

The apparatus employed falls into three parts: a siren sound source mounted on the tow plane, horizontally and vertically spaced microphones mounted on the glider to detect the signal generated by the siren; and electronic equipment referred to as a sonic receiver, mounted in the glider to convert the microphone outputs into a meter reading which indicates relative glider position.

The sonic receiver is made up of two units, a control box containing the band-pass filters and the position indicating meter, which is preferably mounted near the pilot's instrument panel, and an amplifier cabinet which contains AVC amplifiers, phase detectors, and power supply. The cabinet may be mounted at any convenient place in the glider. The two units are connected together by means of a shielded electrical cable.

The position indicating instrument provided for the glider pilot is a direct-reading, two-needle meter, one needle being used for horizontal position and the other for vertical position. A fixed dot at the center of the meter represents the glider, and the point of intersection of the two meter needles gives the correct flying position.

Thus, if the glider is in the correct flying position, the two needles intersect at the center of the meter, as shown in Fig. 5. The meter, as shown in Fig. 8, is of the type responsive to application of voltages across terminals 1 and 2, and terminals 3 and 4. Whenever zero voltage differential exists across pairs of these terminals there is zero current condition and the needles intersect at the center of the meter. If, however, the glider is, say, above and to the right of the correct flying position, the meter needles take the position shown in Fig. 6. This is caused by the application of a voltage differential across both the pairs of terminals causing current flow which moves the needles accordingly. Controls are provided so that the glider pilot may adjust the sensitivity and "zero set" of the meter.

A suitable sound source, denoted by the letter S in Figs. 1–3, is provided at some convenient point as at the tail of the tow plane. It has been found that the noise created by the glider in flight is so great, especially at the low frequency end of the acoustic spectrum, that the airplane propeller noise cannot be detected at the glider.

In order for the acoustic signal from source S reaching the microphones to compete successfully with the turbulence noise, the frequency and sound level at which the source is operated and the design of the receiver are so chosen that they eliminate or at least minimize the effects of this ambient noise. Moreover, the sound source S is light in weight, easily and quickly installed, and takes a minimum of power from the airplane battery.

The sound source S of the invention consists of a modified type of siren which is capable of delivering a signal at a level of about 90 decibels. The siren consists of a cylindrical housing which encloses twenty-four radial fins. These fins form longitudinal passages in the cylinder, through which air entering at one end of the cylinder is driven. At the other end of the cylinder these passages are alternately opened and closed by means of a radially slotted rotor disk. The disk contains twenty-four radial slots and blades, and is driven at 10,000 R. P. M., thus interrupting the air stream through the cylinder 4,000 times per second, and producing a 4,000 C. P. S. sound signal. Means for controlling the frequency automatically is also included in the siren. Other sound sources may be employed such as whistles, magnetic loudspeakers, modulated air flow loudspeakers, and others.

In accordance with a preferred method of carrying out the invention, three microphones are mounted in the nose of the glider as diagrammatically shown in Fig. 4. The microphones are so positioned that when the glider is directly behind the tow plane, sound leaving the source S at a particular instant strikes the three microphones simultaneously; that is, the acoustic signals reaching the three microphones are in phase.

This is further illustrated in Fig. 2 in which, for reasons of simplicity, only two microphones are shown, $M_1$ and $M_2$. The diagram shows that the signals reaching the microphones $M_1$ and $M_2$ have traveled some distance from the sound source. If, however, the glider moves to some other position not directly behind the tow plane, the signal no longer reaches the three microphones at the same instant. This means that the signals reaching the microphones are no longer in phase. Such a condition is illustrated in Fig. 3 in which again only two microphones are shown.

As noted in Fig. 3, the signal reaching $M_1$ travels a distance X further than the signal reaching $M_2$, the difference in phase between the signals reaching the two microphones—

$$\phi = 2\pi \frac{x}{\lambda} \text{ radians}$$

where $\lambda$ is the wave length of the sound signal. Or, in terms of the angle, $\theta$, by which the glider is "off course"

$$\phi = 2\pi \frac{x}{\lambda} = \frac{2\pi d \sin \theta}{\lambda} \text{ radian}$$

Since for angles of interest, $\sin \theta \cong \theta$ $$\phi = \frac{2\pi d}{\lambda} \theta$$

Thus, the phase difference between the signals reaching $M_1$ and $M_2$ is proportional to the space angle $\theta$, which is determined by the position of the glider relative to the tow plane. This is further illustrated in Fig. 1.

The phase difference in the signals reaching $M_1$ and $M_2$ (Fig. 3) is a measure of glider position in a vertical plane above or below the tow plane; the phase difference between the signals reaching $M_2$ and $M_3$ (Fig. 4) is a measure of glider position in a horizontal plane to the right or left of the tow plane. It is the function of the sonic receiver of the invention to which the microphones are connected to convert these two phase differences into meter readings which indicate to the glider pilot his position relative to the correct flying position.

It has been found that at low frequencies the noise levels are least out on the wing of the glider and greatest at its nose. However, for frequencies higher than about 2000 C. P. S. the reverse is true. Since a preferred form of sonic receiver of the invention operates at 4000 C. P. S., the microphones are preferably mounted on the nose of the glider as diagrammatically indicated in Fig. 1.

Various types of microphones may be employed for a sound source such as has been described and having been illustrated in Fig. 1. A modified Westinghouse Electric MC-253, or a vibration cancelling type of microphone, or a condenser microphone may be utilized. These microphones may be mounted either in or on the glider housing. Thus, a streamlined teardrop-shaped unit, extending upwardly from the glider surface, gives excellent results. A preferred arrangement, however, consists in a recessed type of mounting by means of which the microphones are smoothly fitted into the surface of the plane.

An important feature of the invention consists in a special nosepiece for protecting the microphones and enabling them to work quietly in a wind stream such as that developed in the operation of a glider. The protective member consists in a porous bronze part which preferably is fitted into the glider nose in some suitable manner. It may be relatively flat and conform to the contour of a particular section of the plane in which the microphones are mounted or it may take various other shapes.

In Fig. 11 we have shown a nosepiece 10 formed with threads 12 adapted to engage with a supporting structure for microphones. The nosepiece is constructed with a chamber 14, at the outer end of which is fitted a porous bronze part 16. One or more microphones may be located in the chamber directly in back of the bronze part. The function of the porous bronze part is twofold. It assists in providing a surface which is smooth and perfectly free from irregularities or ridges, thus reducing noise. At the same time it provides a means for sound to pass therethrough to the sensitive microphone elements inside.

Such a result is obtained due to the characteristic of the bronze specified, there being pores provided which are small enough so that little or no turbulence effects are produced by wind passing over them. However, the pores in the metal are interconnected so that sound pressures impressed on the external surface of the bronze part can be transmitted to the interior.

Possible reduction or attenuation of sound pressure, arising from use of the porous bronze part, is minimized by reducing the thickness of the porous bronze to a minimum thickness consistent with the required mechanical strength. This is accomplished by fashioning the interior portions of the microphone so that the smallest possible volume of air is trapped between the porous bronze nosepiece and the diaphragm of the sound sensitive elements, and by using sound sensitive elements which present a high acoustic impedance. This means that the diaphragm of the sound sensitive element preferably should be mechanically stiff. The microphones above noted, when arranged with band-pass filters, provide suitable impedance characteristics.

A preferred form of sonic receiver for indicating relative glider position is of the continuous-wave, phase-detecting type. Band-pass filters are employed to minimize the effect of ambient noise, and AVC amplifiers are employed to insure that the meter reading will not be influenced by variations in the signal level.

As has been diagrammatically indicated in Fig. 1, the receiver includes a control box which contains the band-pass filters, and the meter; and the amplifier cabinet which contains the AVC amplifiers, phase detectors, and dynamometer power supply. The control box may, if desired, be mounted in front of the pilot near the instrument panel and the amplifier cabinet may be mounted anywhere in the glider. The entire equipment installed in the glider weighs about 30 pounds, and the current consumption from a 12-volt glider battery is about 4.5 amperes.

The microphones act somewhat as wide band selective filters, attenuating particularly the low frequency end of the ambient noise spectrum. To provide further selective filtering, which is required to be particularly high at the low frequencies, band-pass filters such as are illustrated in Fig. 8 are employed.

The minimum width of the pass band is determined by the frequency stability of the sound source and filters. Since the siren sound source described gives maximum variation of frequency with air speed of about 200 C. P. S., the pass band should be at least 200 C. P. S. wide. In view of the requirements of weight, size, and simplicity needed for glider operation, filters are chosen of the impedance transforming type. A highly selective and structurally simple circuit has been illustrated in the band-pass filter portion of the circuit illustrated in Fig. 8.

An important feature of this part of the sonic receiver circuit is that the microphones are used as an essential part of the filter circuit by constituting the inductance used in the series input arm of the circuit. Because of this, the number of circuit elements and consequently the weight and size of the filter unit are reduced. A sharp cut-off, obtained when the shunt arm resonates, occurs beyond the low frequency end of the pass band, thus giving large attenuation on this side of the pass band.

The capacitances in the tuned arms of the band-pass filter circuit are made up of silver mica condensers (temperature coefficient $+.002\%$ deg.$^{-1}$), zero temperature coefficient ceramic condensers, and negative coefficient ceramic condensers (temperature coefficient $-.07\%$ deg.$^{-1}$), said condensers being combined in such a way that the resonant frequency of each filter arm is constant over a wide temperature range.

A fluctuating signal which has an average value of about 85 db, but which at times drops as much as 15 or 20 db below this, is received by each microphone from the sound source S. The current generated in a microphone passes through the band-pass filter and a phase shifting circuit, thus developing a voltage across the input terminals of an AVC amplifier (Fig. 8).

However, with a sound source of 85 db at the microphone, this voltage is in the order of .001 volt. When the sound level at the microphone drops rapidly to 65 db, this input voltage is only .0001 volt. The phase detecting circuit following the amplifier requires a constant voltage input of about one volt; the amplifier must produce this one volt, as an output for input voltages varying from .001 volt to .0001 volt. Such a constant output voltage is obtained by using an AVC circuit which linearly increases the gain by about 20 db as the signal at the microphone drops from 85 to 65 decibels. The time constant of the AVC circuit is of short length (about .01 seconds) to allow the amplifier to "follow" the signal fluctuations.

Attention is directed to the schematic diagram illustrated in Fig. 8. Two stages are operated as high gain pentode voltage amplifiers. The tuned plate circuit of the second stage is peaked at 4000 C. P. S. with zero temperature coefficient condensers again used to prevent shift in the resonance point with temperature. The third tube is a twin triode with one section used as the output stage of the amplifier channel and the other section is a biased amplifier for the AVC control. A selenium rectifier is used in the AVC circuit. The variable biasing resistor of the AVC amplifier triode is used as a gain control for the amplifier. The two outputs and the amplifier channel are equal in magnitude, but 180° out of phase.

There are two phase detecting circuits provided in the invention as illustrated in Fig. 8. One operates in conjunction with amplifier channels A and C, detecting phase difference between the signals reaching microphones $M_1$ and $M_2$, the second operates in conjunction with amplifier channels B and C, detecting phase difference in signals reaching microphones $M_2$ and $M_3$.

This arrangement may be further observed from an inspection of Fig. 7 of the drawings. Each phase detecting circuit is connected to one of the two movements of the crossed line position indicating meter. Thus, one pointer of the meter indicates to the glider pilot his horizontal position, telling him whether he is to the right or left of the towing airplane, and the other indicates his vertical position, telling the pilot whether he is flying above or below the towing plane. The two phase detecting circuits may, if desired, be mounted on a supporting chassis, forming an independent unit which plugs into the amplifier cabinet.

The action of the phase detecting circuit may be explained as follows: Disregarding for the moment the output from amplifier C, output voltages 1 and 2 from channel A are fed into the twin-diode detector illustrated as 6H6. Each plate of the detector supplies a negative intermittent pulse to one of the grids of the twin-triode amplifier, illustrated as 12SN7, the two pulses being 180° out of phase. This voltage is then amplified and fed to meter terminals 1 and 2. Since the voltages are 180° out of phase, no current flows through meter M. These voltages may be represented by vectors. Since it is desirable to have zero current reading when the glider is in correct flying position behind the tow plane, a phase shift of 90° between the signals of amplifiers A and C is induced by means of a network placed between the filters and the amplifiers, as shown in Fig. 8.

The voltage from output 1 of the channel C amplifier, applied to the phase circuit associated with channel A amplifier, is alternating in character. This is supplied to each grid of the twin-triode amplifier 12SN7. As was stated above, the phase shifter in the channel A circuit causes the signal supplied from channel A to be 90° out of phase with the alternating signal supplied by output 1 of channel C, providing, of course, $M_1$ and $M_2$ are equally spaced from the sound source on the tow plane. Thus, considering the voltage applied from amplifier C when the glider is in a correct position behind the tow plane, the resultant applied voltages are again balanced, and no current flows in the meter. If, however, the glider swings off to one side by some given amount, the resultant applied voltages are no longer balanced and a current flows in the meter circuit. In other words, the output voltages from amplifiers A and C are combined so that the vector sum of these voltages is applied to one amplifier of the phase circuit and the vector difference to the other.

This action can be easily understood by plotting the negative pulsating voltages applied to the phase circuit amplifier grids from channel A on separate lines. By superimposing the alternating output from channel C on each line it will be seen that if the glider is in correct flying position the effect of the alternating voltage on each grid voltage supplied from channel A is such that the resultant applied voltages to the meter terminal are balanced. However, if either $M_1$ or $M_2$ become further displaced from the sound source, the phase relationship between the negative pulses, supplied from channel A, and the alternating voltage, supplied from channel C, is changed and the balance is upset. Thus the resultant applied voltages are different and cause current to flow in the meter.

The current meter reading obtained for a given value of the position includes a divergence which depends upon many factors, e. g., the distance between microphones, the output voltage of the amplifiers, the characteristics of the tubes in the phase circuits, the sensitivity of the motor circuit, etc. However, in operation, all these quantities are fixed, and a simple expression for the meter current, in terms of the position angle, may be given.

Where $\theta$ represents the position angle of divergence, the equation takes the form $$i_m = CV_A \left\{ \left[1+\sin\left(\frac{2\pi d}{\lambda}\sin\theta\right)\right]^{1/2} - \left[1-\sin\left(\frac{2\pi d}{\lambda}\sin\theta\right)\right]^{1/2} \right\} \quad \text{Equation 1}$$

where C is a constant depending upon circuit elements and the sensitivity setting of the meter circuit, $V_A$ is the AVC amplifier output voltage, $d$ is the distance between microphones, and $\lambda$ is the wave length of the sound signal used. Since gliders seldom get "off course" by more than 30 degrees, it is desirable to have maximum meter current correspond to this angle. Assuming that $\theta=30°$ to the largest space angle obtainable, maximum current will be obtained at this angle if $$\sin\left(\frac{2\pi d}{\lambda}\sin 30°\right) = 1 \quad \text{Equation 2}$$

or $$\frac{2\pi d}{\lambda} \cdot \frac{1}{2} = \frac{\pi}{2}$$

or $$\frac{d}{\lambda} = \frac{1}{2}$$

then $$i_m = CA_A \{[1+\sin(\pi\sin\theta)]^{1/2} - [1-\sin(\pi\sin\theta)]^{1/2}\}$$

or, to good approximation, $$i_m = CV_A \{[1+\sin 3\theta]^{1/2} - [1-\sin 3\theta]^{1/2}\} \quad \text{Equation 3}$$

It is assumed that the two sides of the phase circuits are identical. Actually, there are small differences in the component parts of the two sides which are compensated for by the potentiometer in the B+ circuit of the triode D. C. amplifier. It may also be pointed out that the variable resistors in the phase shifting networks may be used to compensate for any undesired relative phase shifts occurring in microphones, filters, or amplifier channels. These variable resistors are accessible on the control box and are used as "zero sets" by the pilot.

From Fig. 7 it may be seen that the two outputs of amplifier A and one output of amplifier C are connected to one phase circuit and both outputs of amplifier B and the other output of amplifier C are connected to the other phase circuit. The two phase circuits are identical in action, and a discussion of the one connected to amplifiers A and C need only be considered. The phase circuits are schematically illustrated in Fig. 8.

In order to get good zero meter reading when the glider is in correct flying position behind the tow plane, it is necessary to induce a phase difference of about 90° between the signals in channel C and those in channels A and B. To accomplish this, phase shifting networks are placed within the band-pass filters and the AVC amplifiers, as has also been shown in Fig. 8.

A schematic diagram of the meter circuit has also been included in Fig. 8. The two identical meter movements connected to the two crossed line indicators give full-scale deflection for about one ma. of current. The sensitivity of the meter circuit may be adjusted by means of the variable resistors $R_{M1}$. These controls, which are accessible on the control box, Fig. 1, enable the pilot to adjust the meter to full-scale deflection for any value of the position angle between 10° and 25°.

Figures 9 and 10 illustrate an alternate form of circuit for measuring and showing the phase difference between signals received by a pair of microphones. The output from the two channels of Figure 10 are supplied to the input channels 1 and 2, of Figure 9.

It will be seen that we have provided an efficient method and apparatus for facilitating glider operation which is positively and particularly adapted to the requirements of glider operations.

Having thus described our invention, what we claim is:

1. In combination with a glider and a tow plane, a sonic transmitter on the tow plane, a plurality of spaced sonic receivers on the glider, means on the glider for combining the outputs of one pair of said receivers displaced in azimuth with respect to said tow plane to produce a signal proportional to the relative displacement in azimuth between the glider and the tow plane, and means on said glider for combining the outputs of one of said pair of receivers and a third receiver displaced in elevation therefrom to produce a signal proportional to the relative displacement in elevation between the glider and the tow plane.

2. The combination according to claim 1, and means for converting the proportional signals into a single visual indication.

3. In a system for indicating the relative position between a glider and a tow plane, the combination comprising a plurality of sonic receivers on the glider equally spaced from the longitudinal axis thereof, means for shifting the phase of the output of one of said receivers, means for combining the phase-shifted output with the output of another of said receivers to produce a signal proportional to the relative displacement in azimuth between the glider and the tow plane, and means for combining the phase-shifted output with the output of still another of said receivers to produce a signal proportional to the relative displacement in elevation between the glider and the tow plane.

4. In a system for indicating the relative position between a glider and a tow plane, the combination with a glider having a nose of a plurality of sonic receivers mounted in said nose and equally spaced from the longitudinal axis thereof, means for combining the outputs of a pair of said receivers to produce a signal proportional to the relative displacement in azimuth between the glider and the tow plane, means for combining the outputs of one of said pair of receivers and a third receiver to produce a signal proportional to the relative displacement in elevation between the glider and the tow plane, and means for converting said signals into a single visual indication.

ROBERT L. WALLACE, Jr.
HAROLD L. ERICSON.

REFERENCES CITED

The following references are of record in the file of this patent:

UNITED STATES PATENTS

| Number | Name | Date |
| --- | --- | --- |
| 1,889,614 | Rice | Nov. 29, 1932 |
| 2,166,991 | Guanella | July 25, 1939 |
| 2,170,835 | Simon | Aug. 29, 1939 |
| 2,403,967 | Busignies | July 16, 1946 |
| 2,449,532 | Leydorf | Sept. 14, 1948 |
| 2,476,301 | Jenks | July 19, 1949 |

Certificate of Correction

Patent No. 2,557,900                                                  June 19, 1951

ROBERT L. WALLACE, Jr., ET AL.

It is hereby certified that error appears in the printed specification of the above numbered patent requiring correction as follows:

Column 6, line 53, for "1800" read *180°*; column 8, line 24, for "$CA_A$" read *$CV_A$*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*